United States Patent
Mullins et al.

(10) Patent No.: US 9,322,508 B2
(45) Date of Patent: Apr. 26, 2016

(54) SYSTEMS AND METHODS FOR APPLYING REINFORCEMENT MATERIAL TO EXISTING STRUCTURES

(75) Inventors: Austin Gray Mullins, Bradenton, FL (US); Rajan Sen, Tampa, FL (US); Danny Winters, Tampa, FL (US)

(73) Assignee: University of South Florida, Tampa, FL (US)

( * ) Notice: Subject to any disclaimer, the term of this patent is extended or adjusted under 35 U.S.C. 154(b) by 701 days.

(21) Appl. No.: 13/602,732

(22) Filed: Sep. 4, 2012

(65) Prior Publication Data
US 2013/0087673 A1 Apr. 11, 2013

Related U.S. Application Data (60) Provisional application No. 61/530,231, filed on Sep. 1, 2011.

(51) Int. Cl.
| | | |
|---|---|---|
| *E01C 11/16* | (2006.01) | |
| *F16M 13/02* | (2006.01) | |
| *B32B 37/00* | (2006.01) | |
| *E04G 23/02* | (2006.01) | |

(52) U.S. Cl.
CPC .......... *F16M 13/027* (2013.01); *B32B 37/0046* (2013.01); *E04G 23/0218* (2013.01); *E04G 2023/0251* (2013.01); *Y10T 156/10* (2015.01)

(58) Field of Classification Search
CPC ..... E04G 23/0218; E04G 21/12; B32B 37/00; Y10T 156/10; E01C 23/04; E01C 23/03; E01C 11/005; E01C 7/147; E01C 7/187
USPC ................... 404/100, 82, 53, 54; 14/77.1, 78; 52/223.8, 514, 514.5; 118/307, 305
See application file for complete search history.

(56) References Cited

U.S. PATENT DOCUMENTS

| | | | | |
|---|---|---|---|---|
| 4,714,507 A | * | 12/1987 | Ohgushi | ................. C04B 24/26 106/33 |
| 5,738,741 A | * | 4/1998 | Crasto | ................. B29C 43/3642 156/285 |
| 5,771,557 A | * | 6/1998 | Contrasto | ............... E01C 7/147 264/36.2 |
| 6,309,732 B1 | | 10/2001 | Lopez-Anido | |
| 6,416,693 B1 | | 7/2002 | Lockwood | |
| 6,464,811 B1 | * | 10/2002 | Meier | ....................... E04C 5/07 156/160 |

(Continued)

OTHER PUBLICATIONS

Randolph Austin Company (2011). http://www.randlophaustin.com/ Accessed Aug. 23, 2011.

(Continued)

*Primary Examiner* — Christopher Garft
(74) *Attorney, Agent, or Firm* — Thomas | Horstemeyer, LLP (57) ABSTRACT

In one embodiment, a system for applying reinforcement material to an existing structure includes a work rail adapted to be temporarily secured to a bottom surface of the structure, adhesive applying apparatus supported by the work rail, the adhesive applying apparatus being adapted to form an adhesive layer on the bottom surface of the structure adjacent the work rail, and reinforcement material applying apparatus supported by the work rail, the reinforcement material applying apparatus being adapted to apply reinforcement material to the adhesive layer formed on the bottom surface of the structure.

20 Claims, 5 Drawing Sheets

(56) References Cited

U.S. PATENT DOCUMENTS

| | | | |
|---|---|---|---|
| 6,507,163 B1 * | 1/2003 | Allen | B25J 9/162 14/78 |
| 6,708,362 B1 * | 3/2004 | Allen | E01D 19/125 14/73 |
| 6,857,156 B1 * | 2/2005 | Grossman | E01D 19/125 14/73 |
| 7,073,536 B2 | 7/2006 | Blackmore | |
| 7,306,687 B2 | 12/2007 | Fyfe | |
| 7,871,483 B2 | 1/2011 | Mullins | |
| 2006/0196146 A1 | 9/2006 | Schwegler | |
| 2009/0013482 A1 | 1/2009 | Kennedy | |
| 2011/0000606 A1 | 1/2011 | Al-Emrani | |

OTHER PUBLICATIONS

Aguilar, et al. "Improvement in FRP-Concrete Bond by External Pressure", Transportation Research Record, No. 2131, pp. 145-154.

Aguilar, et al., "Fiber-Reinforced Polymer Pile Repair Incorporating Cathodic Protection", Transportation Research Record 2150, pp. 111-118.

Khoe, et al., (2011) "Oxygen Permeability of Fiber Reinforced Polymers", ASCE, Journal of Composites for Construction, vol. 15, No. 4, pp. 513-521.

Meier, U (1995), "Strengthening of Structures Using Carbon/Fibre/Epoxy Composites", Construction and Building Materials, vol. 9, No. 6, pp. 341-351.

Sen., et al., "Strengthening Steel Bridge Sections Using CFRP Laminates", Composites, Part B, vol. 32, No. 4, pp. 309-322.

Williams, et al., The West Gate Bridge: Strengthening of a 20th Century Bridge for 21st Century Loading, 10th FRPRCS Symposium, AC SP-275-29 (Ed. R. Sen, R. Seracino, C. Shield and W. Gold), ACI, Farmington Hills, MI.

\* cited by examiner

SYSTEMS AND METHODS FOR APPLYING REINFORCEMENT MATERIAL TO EXISTING STRUCTURES

CROSS-REFERENCE TO RELATED APPLICATION

This application claims priority to co-pending U.S. Provisional Application Ser. No. 61/530,231, filed Sep. 1, 2011, which is hereby incorporated by reference herein in its entirety.

BACKGROUND

Figure 1:
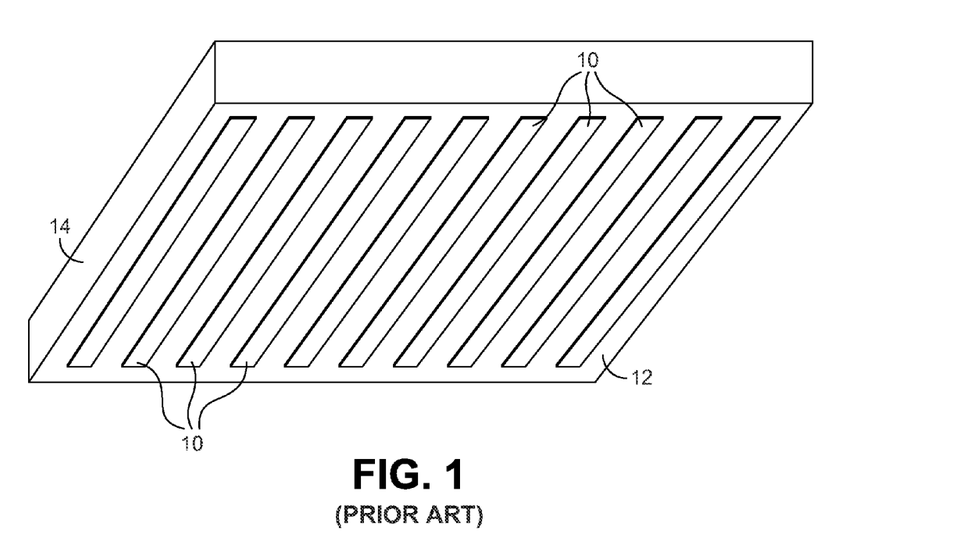
FIG. 1 is a prior art example of strips of reinforcement material that have been applied to the underside of an existing structure.

As concrete structures, such as roads and bridges, age, they may need to be reinforced to maintain their structural integrity. Carbon fiber reinforced polymer (CFRP) laminate has been used in such situations. In particular, strips of CFRP laminate have been applied to the underside of concrete structures to reinforce them. An example of such an application is schematically illustrated in FIG. 1. As is shown in that figure, multiple elongated strips 10 of CFRP laminate can be secured to the bottom surface 12 of a concrete slab 14. The strips 10 can be attached to the slab 14 in a spaced relationship in which the longitudinal axes of the strips are parallel to each other across the width of the slab 14.

Current procedures for the overhead installation of CFRP laminate have changed little over the past 25 years and still rely largely on manual labor. In a typical case, strips of laminate are manually positioned and applied using the outstretched arms of workers, and are then secured using nylon straps normally used for tying down heavy loads. Such ad hoc procedures are both inefficient and time consuming. It can therefore be appreciated that it would be desirable to have alternative means for applying reinforcement materials, such as strips of CFRP laminate, to existing structures.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have alternative means for applying reinforcement materials, such as strips of CFRP laminate, to existing structures. Described herein are systems and methods for applying reinforcement material to existing structures, such as concrete structures. In some embodiments, a system includes work rails that are temporarily secured to the bottom surface of the structure and one or more trolleys that can roll along the rails to apply adhesive to the bottom surface, apply reinforcement material to the adhesive, and urge the reinforcement material against the adhesive until it cures.

In the following disclosure, various specific embodiments are described. It is to be understood that those embodiments are example implementations of the disclosed inventions and that alternative embodiments are possible. All such embodiments are intended to fall within the scope of this disclosure.

Described herein are systems and methods that can be used for strengthening existing structures, including box girder bridges, in congested urban areas where the speed of repair is of paramount importance or in over-water locations where access can be problematic. As will be appreciated from the discussions that follow, repairs can be completed both efficiently and rapidly.

Figure 2:
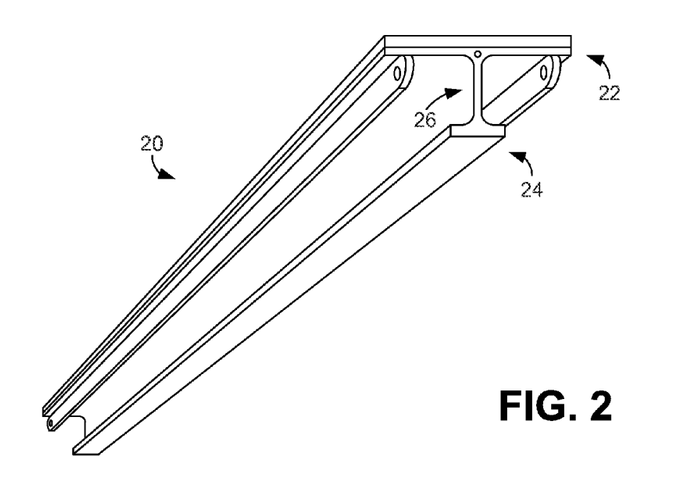
FIG. 2 is a perspective view of an embodiment of a work rail that can be applied to the underside of an existing structure to facilitate application of reinforcement material to the structure.

FIG. 1 illustrates an example of reinforcement material, for example strips 10 of carbon fiber reinforced polymer (CFRP) laminate, applied to the bottom surface 12 of an existing structure, in the form of a concrete slab 14. In accordance with this disclosure, such strips 10 can be applied to a structure using work rails. FIG. 2 illustrates an example of one such work rail 20. As is shown in that figure, the work rail 20 generally comprises an elongated member having a T-shaped cross-section. The T-shape is formed by a first or top portion 22, a second or bottom portion 24, and a central portion 26 that extends between the top portion and the bottom portion. As is described below in greater detail, the work rail 20 can be temporarily anchored to the underside of the structure that is to be reinforced in a parallel, spaced configuration so that elongated gaps are formed between the rails along which reinforcement material can be applied to the structure. The work rails can further provide support to apparatus that urges the reinforcement material against the structure until the adhesive used to secure the material cures.

Figure 3A:
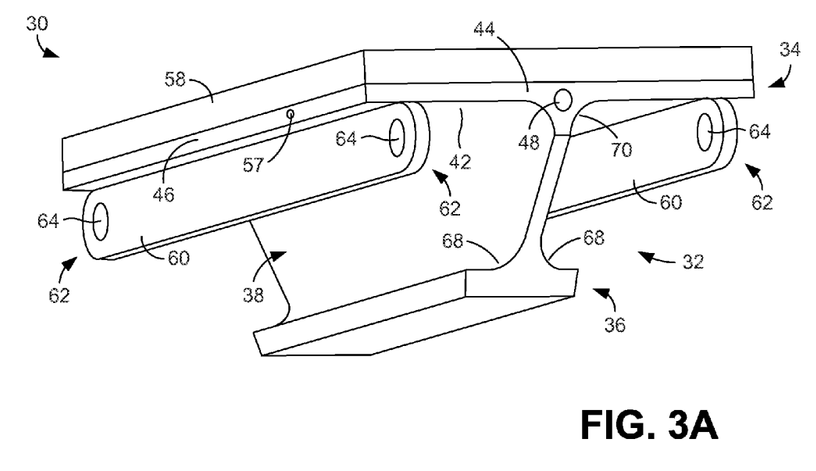
FIGS. 3A and 3B are bottom and top perspective views, respectively, of an embodiment of a segment of a modular work rail.
Figure 3B:
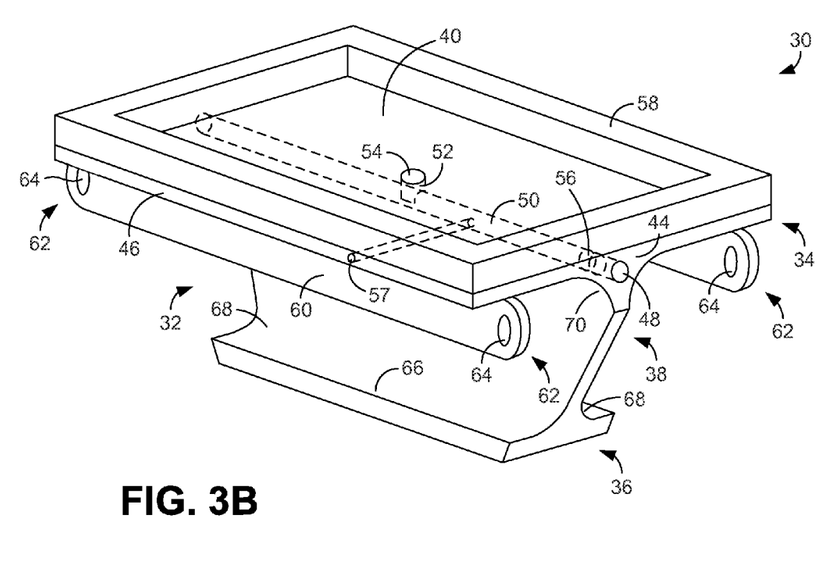

In some embodiments, the work rails 20 can be modular in construction such that they can be coiled for convenient storage and application. In such a case, the work rail 20 can comprise substantially identical individual segments that are connected end-to-end (example shown in FIG. 4). FIGS. 3A and 3B illustrate an example work rail segment 30 that can form part of an elongated modular work rail. As is shown in those figures, the segment 30 generally comprises a body 32 that includes a first or top portion 34, a second or bottom portion 36, and a third or central portion 38 that joins the top and bottom portions, each of which is unitarily formed from a single piece of material. In some embodiments, the body 32 is formed from a polymeric material. In other embodiments, the body 32 is formed from a lightweight metal material, such as aluminum.

In the example of FIGS. 3A and 3B, the top portion 34 and the bottom portion 36 are both substantially planar. In some embodiments, the top and bottom portions 34, 36 are formed as substantially parallel, rectangular plates, with the top portion being significantly larger than the bottom portion. When the segment 30 is applied to a horizontal surface, such as the underside of a concrete structure, the top and bottom portions 34, 36 are substantially horizontal. The central portion 38 can also be substantially planar. However, when the segment 30 is applied to a horizontal surface, the central portion 38 is substantially vertical.

The top portion 34 of the work rail segment 30 includes a top surface 40, a bottom surface 42, and multiple edges defined by opposed end surfaces 44 and opposed lateral surfaces 46. As is apparent from FIGS. 3A and 3B, the end surfaces 44 also form part of the central portion 38. An opening 48 is formed at each end of the segment 30 through the end surfaces 44 that leads to an internal passage 50 (FIG. 3B) that likewise extends from one end of the segment to the other end of the segment. In fluid communication with the first passage 50 is a second passage 52 that leads to an opening 54 formed in the top surface 40 of the top portion 34. As is described below, air can be drawn through the passages 50, 52 when the segment 30 has been applied to the bottom surface of an existing structure to temporarily secure the segment to the surface using suction force. In some embodiments, a one-way valve 56 is associated with the first passage 50 that prevents air from flowing out from the body 32 through the opening 54 to ensure that suction force is not unintentionally lost. In addition, the body 32 can include a release valve 57 that is associated with the first passage 50. When activated, the release valve 57 enables air to flow out from the body 32 through the opening 54 so as to release the segment 30 from the structure.

Provided on the top surface 40 of the top portion 34 of the body 32 is a resilient sealing member 58 that forms an airtight seal between the work rail segment 30 and the surface to which it is applied. As is shown in FIG. 3B, the sealing member 58 can be generally rectangular and can generally trace the edges of the top portion 34. By way of example, the sealing member 58 is made of a neoprene, rubber, silicone, or a similarly pliable material.

With particular reference to FIG. 3A, auxiliary members 60 extend downward from the bottom surface 42 of the top portion 34 of the body 32 near the lateral surfaces 46 of the top portion. The auxiliary members 60 provide a flexible jointed connection and convenient splicing mechanism for varied lengths of work rails. By example, similar flexible connections can also be provided by cables, ropes, full width mesh, or thin plastic strips. In the illustrated embodiment, each auxiliary member 60 is an elongated planar member having rounded ends 62 positioned adjacent the end surfaces 44 of the top portion 34. Formed near each end 62 of the auxiliary members 60 is an openings 64.

As is apparent from FIGS. 3A and 3B, the central portion 38 of the body 32 initially extends straight downward from the end surfaces 44, but eventually tapers inward as the distance from the top portion 34 to the bottom portion 36 is traversed. In some embodiments, the central portion 38 tapers at an angle of approximately 45° as measured from the bottom surface of the bottom portion 36. This taper facilitates coiling of the work rail for compact storage. Alternative coiling can also be provided by coiling the rail in the opposite direction in which case the taper is not needed. Likewise, varied jointing methods may provide different reliefs to facilitate coiling.

The bottom portion 36 of the body 32 defines top surfaces 66 on both sides of the central portion 38 that can be used to support one or more trollies that are used to apply reinforcement material to the existing structure. As is apparent from FIGS. 3A and 3B, the top surfaces 66 join the central portion 38 with fillets 68. Notably, similar fillets 70 are provided at the junction between the central portion 38 and the top portion 34.

Although the dimensions of the work rail segment 30 can depend upon the particular application in which its used, in some embodiments the segment is approximately 3 inches tall (from the top surface of the sealing member 58 to the bottom surface of the bottom portion 36) and approximately 6 inches wide (from one lateral side of the top portion to the opposite lateral side of the top portion).

Figure 4:
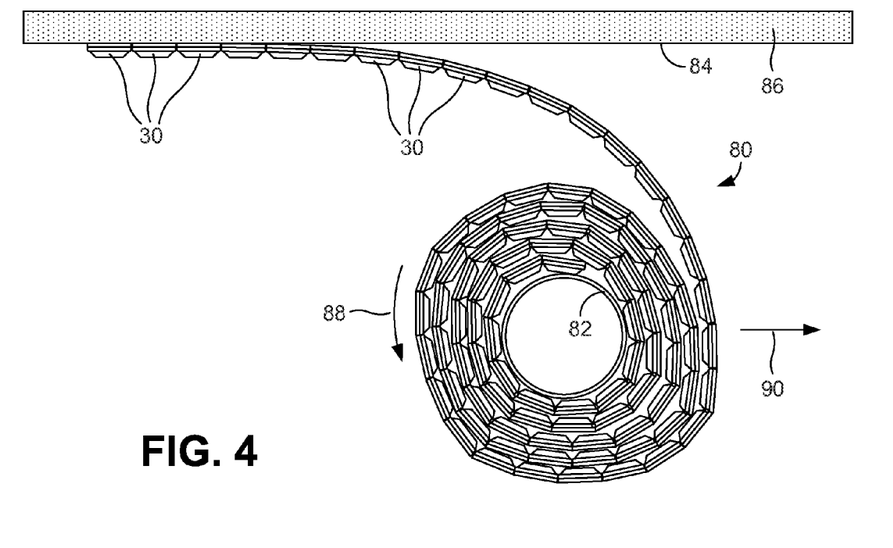
FIG. 4 is a side view illustrating an embodiment of a modular work rail being applied to the underside of an existing structure.

FIG. 4 illustrates an example modular work rail 80 that is formed from the work rail segments 30 shown in FIGS. 3A and 3B. The segments 30 are connected to each other end-to-end to form a continuous chain of segments that together form the length of the work rail 80. As is apparent from FIG. 4, the segments 30 are flexibly connected together with flexible elements such that the segments can bend relative to each other to enable the work rail 80 to be coiled up, for example around an inner tube 82. As is also apparent from FIG. 4, once the work rail 80 has been coiled, it can be uncoiled to apply the rail to the bottom surface 84 of an existing structure 86, such as a concrete structure. This can be achieved by rotating the coil in the direction identified by arrow 88 and linearly displacing the coil in the direction identified by arrow 90. Furthermore, the flexibility offered by the jointed structure of the work rail 80 aids in conforming to the undulating surfaces.

As the work rail 80 is uncoiled, it can be applied to the surface 84 and, if the work rail segments 30 are configured for vacuum anchoring, can be temporarily affixed to the surface using a vacuum. In such a case, the passages of the segments 30 are in fluid communication with each other such that air can be simultaneously drawn through multiple segments, for example using an air pump. When the segments 30 have been applied to the surface 84, the drawing of this air creates a suction force that draws the segments into secure engagement with the structure 86 (as is the case with the first three segments shown in FIG. 4). When the segments 30 include one-way valves, the segments will remain in place even after the air pump or other vacuum source is shut off. In some embodiments, the segments 30 can be adhered to the structure with enough force to have an approximately 550 pound (lb.) support capacity, meaning that each segment can support 550 lbs. of weight without detaching from the structure.

Figure 5:
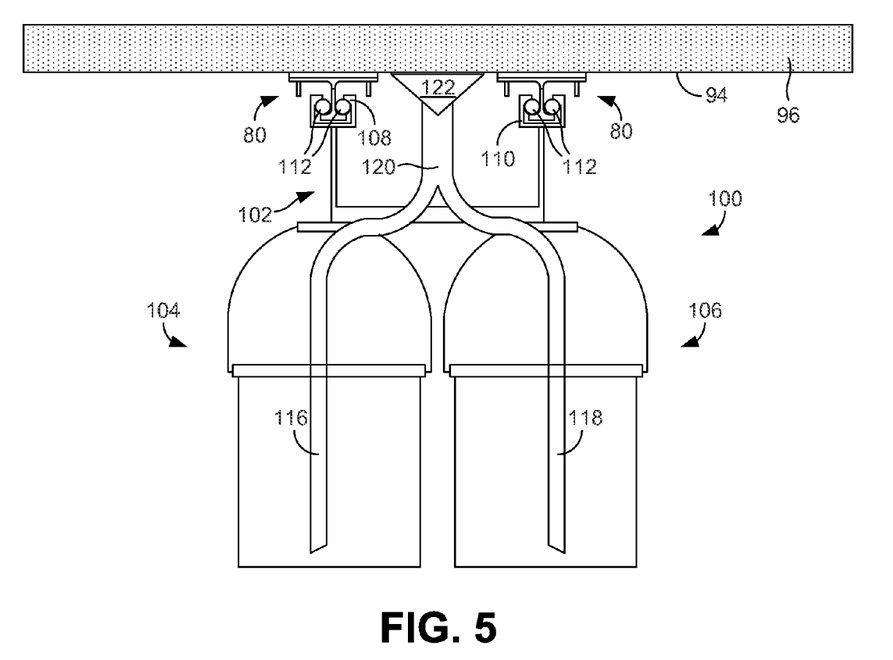
FIG. 5 is an end view illustrating an embodiment of an adhesive applying apparatus in use applying adhesive to the underside of an example structure.

As noted above, work rails can be secured to the underside of the structure in a parallel, spaced configuration to form gaps along which reinforcing members can be adhered to the structure. In some embodiments, two parallel work rails 80 can be used to support the apparatus that is used to secure reinforcement material to the structure. FIG. 5 shows, in end view, two work rails 80 secured to the bottom surface 94 of an example structure 96. By way of example, the work rails 80 can be spaced apart from each other to form an approximately 6 to 12 inch wide gap between them, which is dependent on the width of the laminate.

Before reinforcement material can be secured to the bottom surface 94, adhesive must be applied to the surface. For example, an elongated strip of adhesive can be applied to the surface 94 that has similar dimensions to the reinforcement material that is to be applied. FIG. 5 illustrates an example apparatus for applying the adhesive. More particularly, FIG. 5 illustrates an adhesive applying apparatus 100. The apparatus 100 includes a trolley 102 that is configured to support two tanks from the work rails 80. In some embodiments, the trolley 102 includes a first carriage 108 that is supported by the first work rail 80, and a second carriage 110 that is supported by the second work rail 80. In the illustrated embodiment, each carriage 108, 110 comprises wheels or bearings 112 that enable the carriage to roll along the length of its associated work rail 80 (into and out of the page in FIG. 5). The wheels or bearings 112 can be contained within a housing that places the wheels or bearings in direct contact with the top surfaces 66 of the bottom portion 36 of the rail segment bodies 32 (see also FIG. 3A).

In some embodiments, the tanks 104, 106 include a resin tank 104 that contains an epoxide resin and a hardener tank 106 that contains a polyamine hardener that, when mixed, cure to form a strong epoxy. Each adhesive component can be drawn from the tanks 104, 106 using draw tubes 116 and 118 that extend down into their respective tanks. The draw tubes 116, 118 join to form a mixing tube 120 in which the two components are mixed. In some embodiments, rotatable mixing blades (not shown) are provided within the mixing tube 120 to thoroughly mix the resin and hardener just before the mixture is output from the apparatus 100. With such an arrangement, the two adhesive components are only mixed when needed, thereby reducing waste.

Attached to the end of the mixing tube 120 is a nozzle 122 that is adapted to apply a thin layer of uncured adhesive to the surface 94 between the work rails 80. In some embodiments, the adhesive layer can have a thickness of approximately 1 to 2 millimeters (mm) and a width of approximately 100 to 150 mm, matched to the width and requirements of the laminate dimensions (typically approximately 1 to 2 mm greater than the reinforcement material width). Of course, the length of the adhesive layer depends upon the length of the reinforcement material that is to be secured to the structure 96.

In some embodiments, the adhesive applying apparatus 100 can be manually pulled along the work rails 80. In other embodiments, the apparatus 100 can be driven by a motor (not shown) so that the apparatus traverses the rails at a predetermined constant speed. In such cases, the blades of the mixing tube 120 can be mechanically linked to the motor so as to deliver uncured adhesive at a flow rate that is appropriate for the linear speed of the apparatus 100 along the rails 80.

Figure 6:
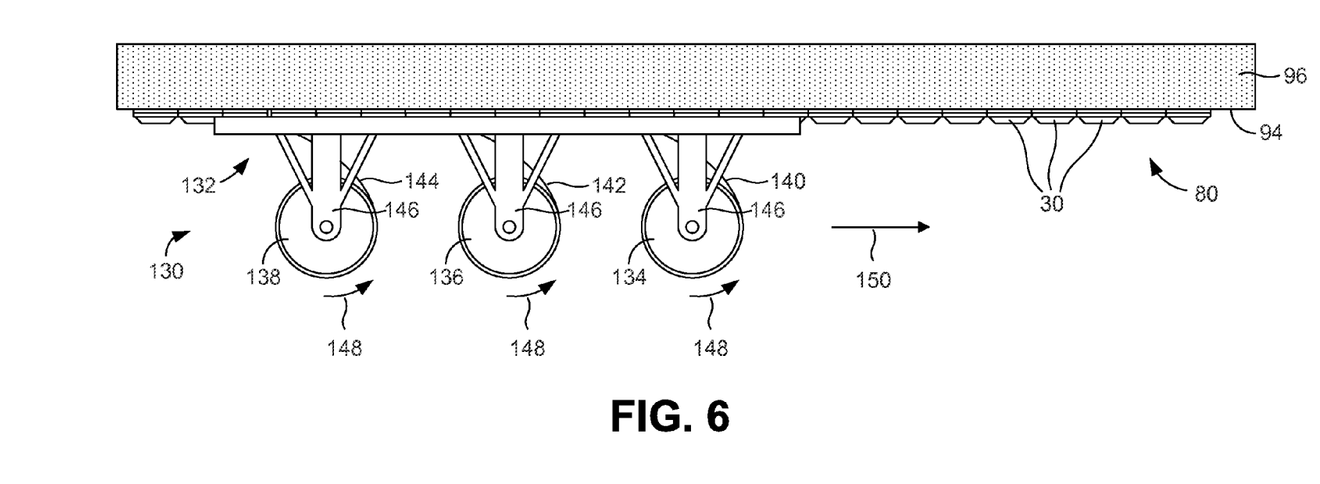
FIG. 6 is a side view illustrating an embodiment of a reinforcement material applying apparatus in use applying reinforcement material to the underside of the example structure.

It is noted that single-component adhesives (such as urethanes) could also be used which are activated by moisture in the air, or resins that are externally activated. Such adhesives negate the mixing process and also limit waste of unused materials Once a layer of uncured adhesive has been applied to the surface 94 of the structure 96, reinforcement material can be applied to the adhesive layer. In some embodiments, this can be achieved using a reinforcement material applying apparatus that can be either connected to the adhesive applying apparatus 100 or separate from that apparatus. FIG. 6 illustrates a separate reinforcement material applying apparatus 130 that can be used after or as the adhesive layer is applied. As is shown in FIG. 6, the apparatus 130 comprises a trolley 132 that, like the trolley 102, can be supported by two adjacent work rails 80 (only one work rail visible in the side view of FIG. 6). In some embodiments, the trolley 132 can also include first and second carriages (not visible) that are supported by the work rails 80. Like the carriages 108, 110, each carriage can comprise wheels or bearings that enable the trolley 132 to roll along the lengths of its work rails 80 (to right in FIG. 6).

In the embodiment of FIG. 6, the trolley 132 supports three different reels, 134, 136, and 138, each of which supports a different component. From right to left, the components are reinforcement material 140, such as of CFRP laminate, an inflatable member 142, and a retaining member 144, which are respectively wound upon the reels, 134, 136, and 138. These three components are applied to the structure 96 in sequence as the trolley 132 traverses the rails 80. Each reel 134-138 is supported by a frame 146 that is coupled to the trolley 132, and each reel is configured to rotate in the directions identified by arrows 148 as the trolley linearly traverses the rails 80 in the direction identified by arrow 150.

Figure 7:
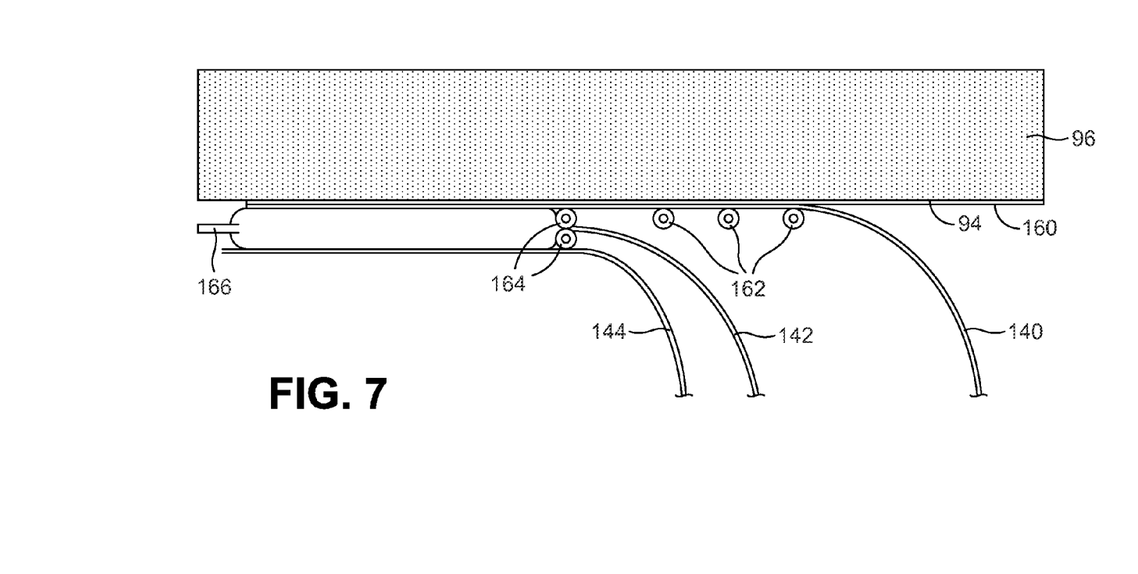
FIG. 7 is a detail side view illustrating the reinforcement material applying apparatus of FIG. 6 in applying reinforcement material to the underside of the example structure.

FIG. 7 is a detail view that illustrates sequential application of each of the three components to the structure 96 (work rails 80 and trolley 132 not shown for purposes of clarity). As is shown in FIG. 7, a layer of uncured adhesive 160 has already been applied to the bottom surface 94 of the structure 96, for example using the adhesive applying apparatus 100 described above with reference to FIG. 5. By way of example, that apparatus 100 can have just traversed the rails 80. As the trolley 132 traverses the rails 80, the reinforcement material 140 is payed out from its reel 134 so that it can be applied to the adhesive layer 160. One or more elongated support rollers 162 that are mounted to the trolley 132 can be used to hold the reinforcement material 140 against the adhesive layer 160 until such time that portion of the reinforcement material is supported by the inflatable member 142 in the manner described below.

Simultaneous to the application of the reinforcement material 140 to the adhesive layer 160, the inflatable member 142 is payed out from its reel 136 so that it can be applied against the reinforcement material. In some embodiments, the inflatable member 142 comprises an elongated, thin-walled polymeric or rubber tube that is in a collapsed form on the reel 136 but which can be inflated with air once in place near the applied reinforcement material 140. As is shown in FIG. 7, the inflatable member 142 can pass between a nip formed by two elongated pinch rollers 164. The pinch rollers 164 serve to both align the inflatable member 142 relative to the reinforcement material 140 and to limit the extent to which the inflatable member can be inflated. Such inflation can be performed using an inflation tube 166 that is in fluid communication with the interior of the inflatable member 142. When air is passed through the tube 166 and into the inflatable member 142, the portion of the inflatable member that has passed through the nip formed by the pinch rollers 164 inflates, as is illustrated in FIG. 7. Such inflation expands the inflatable member 142 so that it urges the reinforcement material 140 into firm contact with the adhesive layer 160.

Figure 8:
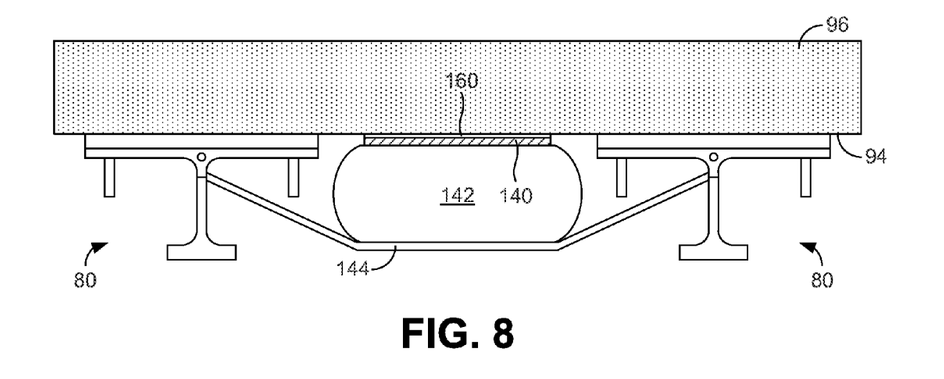
FIG. 8 is an end view illustrating the reinforcement material being urged into contact with the example structure.

Simultaneous to the application and inflation of the inflatable member 138, the retaining member 144 is payed out from its reel 138 so that it can be used to support the inflatable member 142 and ensure that it is urged against the reinforcement material 140 with sufficient force. FIG. 8 illustrates the three components after they have been applied to the structure 96. As can be appreciated from that figure, the retaining member 144 can attach to both work rails 80 to support the inflatable member 142 and keep it in intimate contact with the reinforcement material 140.

Figure 9:
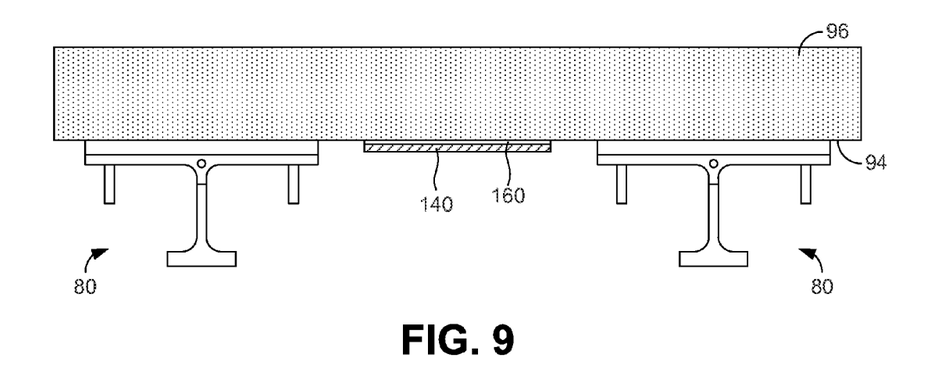
FIG. 9 is an end view illustrating the reinforcement material adhered to the example structure.
Figure 10:
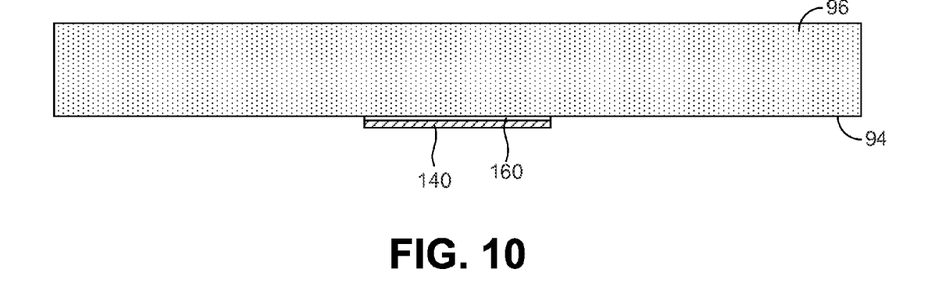
FIG. 10 is an end view illustrating the reinforcement material adhered to the example structure after the work rails have been removed.

Once the three components have been applied in the manner shown in FIG. 8, the adhesive (e.g., epoxy) can be permitted to cure. After a desired amount of curing has been achieved, for example after several hours, the inflatable member 142 can be deflated and the retaining member 144 and the inflatable member can be removed, as indicated in FIG. 9. The unused portion of the reinforcement material 140, the inflatable member 142, and the retaining member 144 can each be rewound on their respective reels 134-138 so as to be prepared for use in applying the next length of reinforcement material to the structure 96. At this point, the work rails 80 can be removed, as indicated in FIG. 10, so that the final result is achieved. Of course, one or both of the rails 80 can be left in place to facilitate application of an adjacent strip of reinforcement material 140 to the structure 96. In cases in which the work rails 80 include release valves, the release valves can be activated to nullify the vacuum forces that secure the rail segments 30 to the structure 96.

As mentioned above, various alternative embodiments are possible. For example, while the adhesive applying apparatus and the reinforcement material applying apparatus have been shown and described as being separate apparatuses, they can be combined into a single apparatus. In such a case, the two apparatuses would share the same trolley that is suspended by the work rails.

The invention claimed is:

1. A system for applying reinforcement material to an existing structure, the system comprising:
    a work rail adapted to be temporarily secured to a bottom surface of the structure, wherein the work rail is a modular work rail that is composed of multiple rail segments that are connected together end-to-end;
    adhesive applying apparatus supported by the work rail, the adhesive applying apparatus being adapted to form an adhesive layer on the bottom surface of the structure adjacent the work rail; and
    reinforcement material applying apparatus supported by the work rail, the reinforcement material applying apparatus being adapted to apply reinforcement material to the adhesive layer formed on the bottom surface of the structure.

2. The system of claim 1, wherein the rail segments are flexibly connected together such that they can bend relative to each other to enable the rail to be coiled up.

3. The system of claim 1, wherein at least one work rail segment comprises a body that includes a top portion, a bottom portion, and a central portion that joins the top and bottom portions.

4. The system of claim 3, wherein the body is unitarily formed from a single piece of a polymeric material.

5. The system of claim 3, wherein the top, bottom, and central portions are substantially planar.

6. The system of claim 3, wherein a top surface of the top portion includes an opening and the body includes a passage that is in fluid communication with the opening and wherein air can be drawn through the opening and the passage to secure the rail segment to the bottom surface of the structure with suction force.

7. The system of claim 6, wherein the rail segment further comprises a resilient sealing member provided on the top portion of the body that surrounds the opening.

8. The system of claim 6, wherein the rail segment further comprises a one-way valve associated with the passage that only permits air to flow in one direction through the passage.

9. The system of claim 8, wherein the rail segment further comprises a release valve associated with the passage that enables air to enter the passage.

10. The system of claim 3, wherein the bottom portion forms top surfaces adapted to support wheels or bearings of one or both of the adhesive applying apparatus and the reinforcement material applying apparatus.

11. The system of claim 1, wherein the adhesive applying apparatus comprises a trolley that supports two tanks, each tank adapted to contain a different adhesive component.

12. The system of claim 11, wherein the trolley includes a carriage, the carriage comprising wheels or bearings that are directly supported by the work rail and that enable the trolley to roll along the length of the rail.

13. The system of claim 11, further comprising a mixing tube in which the adhesive components can be mixed to form an adhesive.

14. The system of claim 13, further comprising a nozzle adapted to apply the adhesive to the bottom surface of the structure.

15. The system of claim 1, wherein the reinforcement material applying apparatus comprises a trolley that includes a carriage, the carriage comprising wheels or bearings that are directly supported by the work rail and that enable the trolley to roll along the length of the rail.

16. The system of claim 15, wherein the trolley supports a reel upon which reinforcement material is wound.

17. The system of claim 16, wherein the reinforcement material is carbon fiber reinforced polymer (CFRP).

18. The system of claim 16, wherein the trolley further supports a reel upon which an inflatable member is wound, the inflatable member being adapted to urge the reinforcement material into contact with the adhesive.

19. The system of claim 18, wherein the trolley further supports a reel upon which a retaining member is wound, the retaining member being adapted to urge the inflatable member against the reinforcement material.

20. The system of claim 19, wherein the trolley further comprises support rollers adapted to hold the reinforcement material against the adhesive until the inflatable member is urged against the reinforcement material.

* * * * *